UNITED STATES PATENT OFFICE.

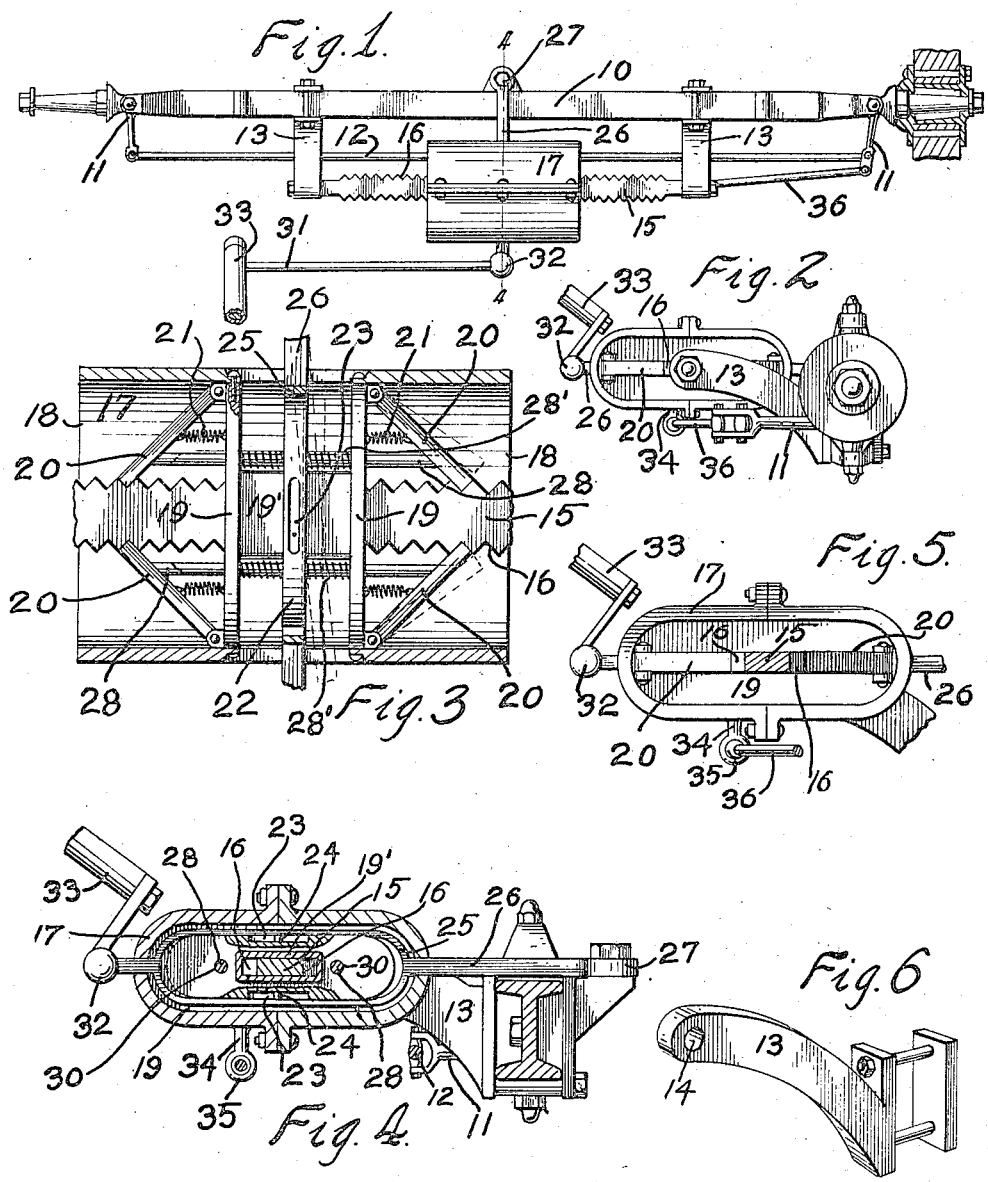

NORMAN B. WOODHEAD, OF CLAY CENTER, NEBRASKA, ASSIGNOR OF ONE-HALF TO GEORGE A. ALLEN, OF CLAY CENTER, NEBRASKA.

AUTOMATIC STEERING-GEAR LOCK.

1,262,896.      Specification of Letters Patent.      Patented Apr. 16, 1918.

Application filed June 12, 1917. Serial No. 174,264.

*To all whom it may concern:*

Be it known that I, NORMAN B. WOODHEAD, a citizen of the United States, residing at Clay Center, in the county of Clay, State of Nebraska, have invented certain new and useful Improvements in Automatic Steering-Gear Locks; and I do hereby declare the following to be a full, clear, and exact description of the invention, such as will enable others skilled in the art to which it appertains to make and use the same.

This invention is an improvement in steering mechanism for automobiles and has particular reference to a lock device therefor.

An object of the invention is to provide an improved means for locking the steering mechanism of an automobile whereby the front wheels will be releasably retained in the positions to which they are adjusted by the steering wheel so as to prevent swerving of the machine from its course due to the unintentional movements of the front wheels thereof when traveling over rough roads or striking obstacles over which the wheels may pass.

Another object is to provide a device of this character which is simple in construction, easy to manufacture and readily applicable to steering gear of certain construction.

The inventive idea involved is capable of receiving a variety of mechanical expressions, one of which, for the purpose of illustrating the invention, is shown in the accompanying drawing, wherein:—

Figure 1 is a top plan view of the front axle and steering gear of a motor vehicle showing the invention applied thereto.

Fig. 2 is a side elevation thereof.

Fig. 3 is an enlarged sectional view taken horizontally through the casing and the yoke, the adjacent parts being shown in top plan and the releasing position of the parts being indicated in dotted lines.

Fig. 4 is a section on line 4—4 of Fig. 1, with the adjusting plate in elevation, parts of the latter being broken away.

Fig. 5 is a transverse section through the stationary locking bar showing the adjustable part of the locking device in end elevation.

Fig. 6 is a perspective view of one of the locking bar supporting hangers.

The invention is particularly adapted for use in connection with the Ford automobile and the drawing illustrates the front axle 10 thereof having the usual steering knuckles 11 at each end thereof and joined by the tie-rod 12.

The locking device which comprises the essential feature of the invention is shown in what is now believed to be its preferred form and consists of a pair of hangers or supporting brackets 13 secured to the axle 10 and extending rearwardly at right angles therefrom, the rear ends of said hangers being provided with openings 14 for receiving the ends of a stationary bar 15 supported in position by means of these hangers and provided upon the opposite longitudinal edges thereof with the rack teeth 16.

The adjustable element of the locking device preferably comprises a sectional casing 17 having open ends 18 through which the rack bar 15 extends. Within the casing 17 there is positioned a pair of end plates 19 connected by a sleeve 19' surrounding the bar 15, each plate 19 having pivoted thereto at diametrically disposed points the locking pawls 20 the free ends of which normally engage the rack teeth 16, being yieldingly held in such position by means of the small springs 21 secured to said plates and said pawls. The engagement of these pawls with the rack teeth 16 prevents a sliding movement of the adjustable element of the locking device, including the casing 17, longitudinally of the rack bar 15. However, means are provided for disengaging the pawls 20, carried by the plates 19, from the teeth 16 so that the casing 17 may be adjusted longitudinally of the bar 15 and, to this end, use is preferably made of an intermediate adjusting plate 22 slidably engaged on the sleeve 19' between the plates 19 and having a grooved periphery 23 for receiving the pins 24 of the yoke portion 25 of the shiftable lever 26 one end of which is pivoted at 27 to the axle 10. This intermediate plate 22 is provided with oppositely extending arms or pins 28 which extend through openings 30 in said plates to contact the adjacent pawls 20 to disengage the same from the teeth 16 when the adjusting plate 22 is moved. It will be seen from this description that when the lever 26 is operated in one direction, in a manner to presently appear, the plate 22 will be shifted and the pins 28, extending in the direction in which the plate is moved, and contacting the adjacent pawls 20 will disengage the same from the teeth 16 and thus permit of a movement of the adjustable part of the locking device in its entirety in the same direction as the plate 22 is shifted. Open springs 28′ are engaged with the pins 28 between the plate 22 and the plates 19, the plate 22 being thus free to move with respect to the plate 19 until the springs are compressed, when the plates will be moved as will be understood. Since the plates 19 are secured to the casing 17 as shown at 17′, the casing will be moved with the plates.

The means for shifting the lever 26 preferably includes a rod 31 connected at one end by a universal joint 32 to the rear end of the lever 26 and at its other end to the usual steering post 33 so that when said steering post is operated the rod 31 will be adjusted to shift the lever 26 in the desired direction. In order to transmit the adjustment of the movable part of the locking device to the steering knuckles 11, the casing 17 is preferably provided with a downwardly extending arm or lug 34 to which is connected by a universal joint 35 one end of a rod 36 the other end of which is secured to one of the knuckles 11 so that any movement of the casing 17 longitudinally of the bar 15 will be transmitted to said knuckles through the medium of the rod 36.

What is claimed is:—

1. The combination with the front axle of a motor vehicle, and a steering gear associated therewith; of a locking device including a stationary rack bar supported by said axle, a casing movable longitudinally of said stationary member and connected to a portion of said steering gear, oppositely disposed end plates mounted in said casing, locking pawls carried by each plate and normally engaging said rack bar to prevent movement of the casing thereon in either direction, an intermediate plate adjustable between said end plates and having contacts for engaging said pawls whereby to disengage the pawls carried by one end plate when said intermediate plate is adjusted in one direction, and a lever pivoted to said axle and engaging said intermediate plate and connected to a portion of said steering gear whereby upon the actuation of the latter said intermediate plate is adjusted to disengage certain of said pawls from said rack bar to permit of an adjustment of said casing and the first mentioned portion of said steering gear in one direction.

2. A locking and unlocking device including a fixed bar having teeth upon its opposite sides, a sleeve slidably engaged upon the bar, plates carried by the sleeve in spaced relation to each other, pawls pivoted to the plates for movement into and out of engagement with the teeth of the fixed bar, a member slidably engaged with the sleeve between the plates, pins carried by the member and engaged through the plates, said pins being movable with the member to bring their outer ends into engagement with the pawls to disengage the pawls from the teeth of the fixed bar, said member being arranged for movement of the sleeve and the plates therewith subsequent to disengagement of the pawls from the teeth of the fixed bar and means for holding the pawls yieldably in engagement with the teeth.

3. A locking and unlocking mechanism including a fixed member 15, a member 17 movable with respect to the fixed member, separate means 20 connected with the movable member for locking it to the fixed member against movement in opposite directions, a member 22 between said locking means and movable with respect to the fixed member 15 and including slidable means 28 disposed for engagement of the locking means 20 for movement of the locking means 20 alternately out of engagement with the fixed member 15 through corresponding movement of said member 22.

In testimony whereof, I affix my signature in the presence of two witnesses.

NORMAN B. WOODHEAD.

Witnesses:
 GEORGE A. ALLEN,
 JOHN STARE.

Copies of this patent may be obtained for five cents each, by addressing the "Commissioner of Patents, Washington, D. C."